(12) United States Patent
Moniz et al.

(10) Patent No.: US 7,934,901 B2
(45) Date of Patent: May 3, 2011

(54) AIR DIRECTING ASSEMBLY AND METHOD OF ASSEMBLING THE SAME

(75) Inventors: Thomas O. Moniz, Loveland, OH (US); Kelly Sue Spinosa, West Chester, OH (US); Robert J. Orlando, West Chester, OH (US); Philip Robert Viars, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1088 days.

(21) Appl. No.: 11/643,495

(22) Filed: Dec. 20, 2006

(65) Prior Publication Data
US 2010/0034639 A1 Feb. 11, 2010

(51) Int. Cl.
*F01B 25/02* (2006.01)
(52) U.S. Cl. ......................... 415/115; 415/144
(58) Field of Classification Search .................. 415/115, 415/143, 144, 211.2; 416/175, 198 A, 201 R, 416/203; 60/782, 785, 806
See application file for complete search history.

(56) References Cited

U.S. PATENT DOCUMENTS

| | | | |
|---|---|---|---|
| 3,647,313 A * | 3/1972 | Koff | 415/115 |
| 3,751,909 A * | 8/1973 | Kohler | 60/39.17 |
| 3,844,110 A | 10/1974 | Widlansky et al. | |
| 5,327,719 A * | 7/1994 | Mazeaud et al. | 60/785 |
| 5,575,617 A * | 11/1996 | Marmilic et al. | 415/115 |
| 5,611,197 A * | 3/1997 | Bunker | 60/806 |
| 5,687,563 A | 11/1997 | Thompson, Jr. | |
| 6,227,799 B1 * | 5/2001 | Kuhn et al. | 415/115 |
| 6,334,755 B1 * | 1/2002 | Coudray et al. | 415/115 |
| 6,361,277 B1 | 3/2002 | Bulman et al. | |
| 6,561,760 B2 * | 5/2003 | Wadia et al. | 415/145 |

FOREIGN PATENT DOCUMENTS

| | | |
|---|---|---|
| GB | 802906 | 10/1958 |
| GB | 1095129 | 12/1967 |

OTHER PUBLICATIONS

Intellectual Property Office, Examination Report for Application No. GB0724424.7, Oct. 8, 2010, 4 pages, UK.

* cited by examiner

*Primary Examiner* — Edward Look
*Assistant Examiner* — Sean J Younger
(74) *Attorney, Agent, or Firm* — William Scott Andes, Esq.; Armstrong Teasdale LLP

(57) ABSTRACT

A gas turbine engine assembly is provided. The gas turbine engine assembly includes a high-pressure compressor including a first rotor and a second compressor rotor disposed downstream from the first rotor, a high-pressure turbine coupled downstream to the compressor by a first shaft, and an air directing assembly coupled between the first and second compressor rotors for selectively channeling airflow discharged from the first compressor rotor through the first shaft. A method of assembling a gas turbine engine is also provided.

14 Claims, 5 Drawing Sheets

AIR DIRECTING ASSEMBLY AND METHOD OF ASSEMBLING THE SAME

BACKGROUND OF THE INVENTION

This invention relates generally to gas turbine engines and more particularly to air directing assemblies used with turbine engines.

At least some known gas turbine engines channel compressed discharged air from a fan through a core engine. The core engine includes a compressor, a combustor coupled downstream from the compressor, and a turbine coupled downstream from the combustor. A portion of the fan airflow is directed to the compressor wherein the air is compressed. The compressed air is then channeled to a combustor wherein fuel is injected to create high energy combustion gases used to drive the turbine.

At least one known gas turbine engine also includes an outer bypass duct that extends radially outward of the core engine. The outer bypass duct enables a portion of the airflow discharged from the fan to bypass and flow around the core engine. Although such engines generally enhance performance, such engines also have an increased outer diameter and weigh more than engines that do not use bypass flow. As a result, the benefits gained from such an engine design may be outweighed by the performance detriments of the additional weight.

BRIEF DESCRIPTION OF THE INVENTION

In one aspect, a method of assembling a gas turbine engine is provided. The method includes providing a high-pressure compressor including a first rotor and a second compressor rotor coupled downstream from the first rotor, coupling a high-pressure turbine downstream from the compressor such that the turbine is coupled to the compressor by a first shaft such that the first shaft includes an internal air duct defined therein, and coupling an air directing assembly between the first and second compressor rotors wherein the air directing assembly is configured to direct a portion of airflow discharged from the first rotor inward through the internal air duct.

In a further aspect, a gas turbine engine assembly is provided. The gas turbine engine assembly includes a high-pressure compressor including a first rotor and a second compressor rotor disposed downstream from the first rotor, a high-pressure turbine coupled downstream to the compressor by a first shaft, and an air directing assembly coupled between the first and second compressor rotors for selectively channeling airflow discharged from the first compressor rotor through the first shaft.

In a further aspect, an air directing assembly is provided. The air directing assembly includes a pair of rings and a body extending therebetween wherein the air directing assembly is configured to direct airflow inward through the gas turbine engine.

DETAILED DESCRIPTION OF THE INVENTION

Figure 1:
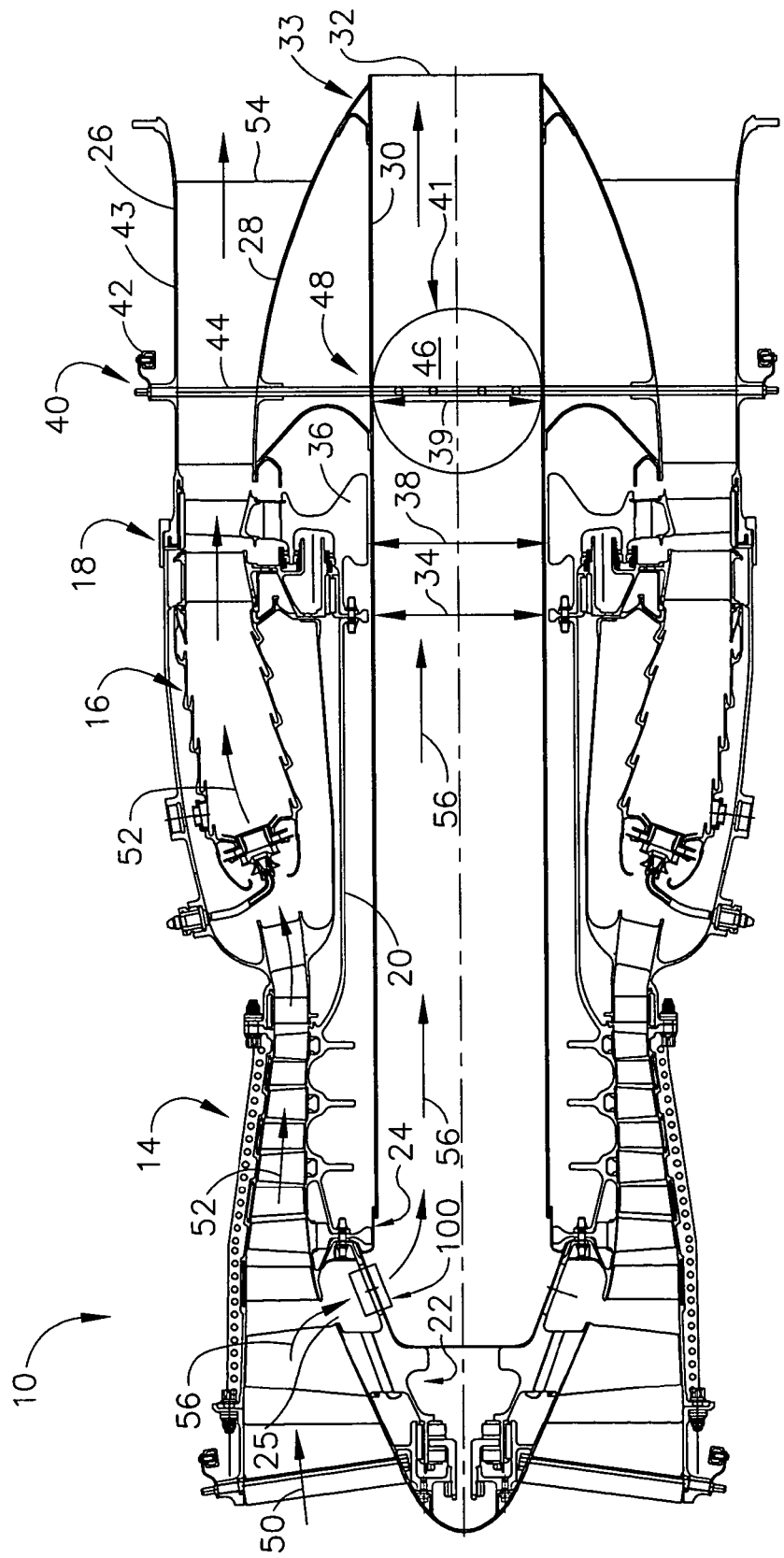
FIG. 1 is a cross-sectional view of an exemplary core gas turbine engine.

FIG. 1 is a schematic illustration of a core gas turbine engine 10. Core gas turbine engine 10 includes a high-pressure compressor 14, a combustor 16, a high-pressure turbine 18, and a shaft 20 that is coupled between high-pressure compressor 14 and high-pressure turbine 18. Compressor 14 includes a first compressor rotor 22 and an adjacent second compressor rotor 24 coupled downstream from first compressor rotor 22. As used herein, first and second compressor rotors 22 and 24 may be any two adjacent rotor sections within compressor 14. Each rotor 22 and 24 includes a rotor disk. A gap 25 is defined between disks of first and second compressor rotors 22 and 24. In the exemplary embodiment, gap 25 is approximately 0.8 inches.

During operation of engine 10, airflow 50 enters engine 10 and is channeled through first compressor rotor 22. A first portion 52 of airflow 50 is channeled downstream through second compressor rotor 24 wherein it is mixed with fuel, and ignited to generate combustion gases that are eventually discharged downstream through discharge nozzle outlet 54. A second portion 56 of airflow 50 is channeled through gap 25 and into an air directing assembly that is described in detail below.

In the exemplary embodiment, core gas turbine engine 10 includes a rear frame 26 and a centerbody 28. Rear frame 26 extends circumferentially about a portion of core gas turbine engine 10 and extends downstream from high-pressure turbine 18. Centerbody 28 extends circumferentially about an internal air duct 30 and extends downstream from turbine 18. Centerbody 28 is spaced radially inward from rear frame 26 and radially outward from duct 30.

Core gas turbine engine 10 also includes duct 30. Duct 30 is defined within shaft 20 such that duct 30 is substantially concentrically aligned within shaft 20. Duct 30 extends downstream from first compressor rotor 22 to an outlet 32 defined at an aft end 33 of engine 10. In the exemplary embodiment, duct 30 is defined with a substantially constant diameter 34. For example, in one embodiment, diameter 34 is approximately five inches. Alternatively, diameter 34 may be any size that enables engine 10. In the exemplary embodiment, high-pressure turbine 18 includes a high-pressure turbine disk 36, and disk 36 has an inner diameter 38 that is larger than duct diameter 34.

In the exemplary embodiment, core gas turbine engine 10 includes a control valve assembly 40 rotatably coupled downstream from high-pressure turbine 18. In the exemplary embodiment, valve assembly 40 also includes an actuator 42, and a stem 44 extending between actuator 42 and a valve body 46. In the exemplary embodiment, valve body 46 is a butterfly valve 41. In an alternative embodiment, valve body 46 is a ball valve. In the exemplary embodiment, actuator 42 is coupled to a radially outer surface 43 of rear frame 26 and is actuated hydraulically. In an alternative embodiment, actuator 42 is actuated through any other means that enables control valve assembly 40 to function as described herein, such as but not limited to, electrically or pneumatically actuated. In the exemplary embodiment, actuator 42 is operated automatically. In an alternative embodiment, actuator 42 is manually operated. In the exemplary embodiment, valve body 46 is coupled to stem 44 such that rotation of stem 44 controls movement of valve body 46. Stem 44 extends through rear frame 26, centerbody 28, and duct 30. In the exemplary embodiment, body 46 is rotatably coupled within duct 30 to selectively control a flow of air through duct 30. In the exemplary embodiment, body 46 has a diameter 39 that is slightly smaller than diameter 34 of duct 30. More specifically, in the exemplary embodiment, the operation of control valve assembly 40 is electrically coupled to the operation of an air directing assembly 100.

Figure 2:
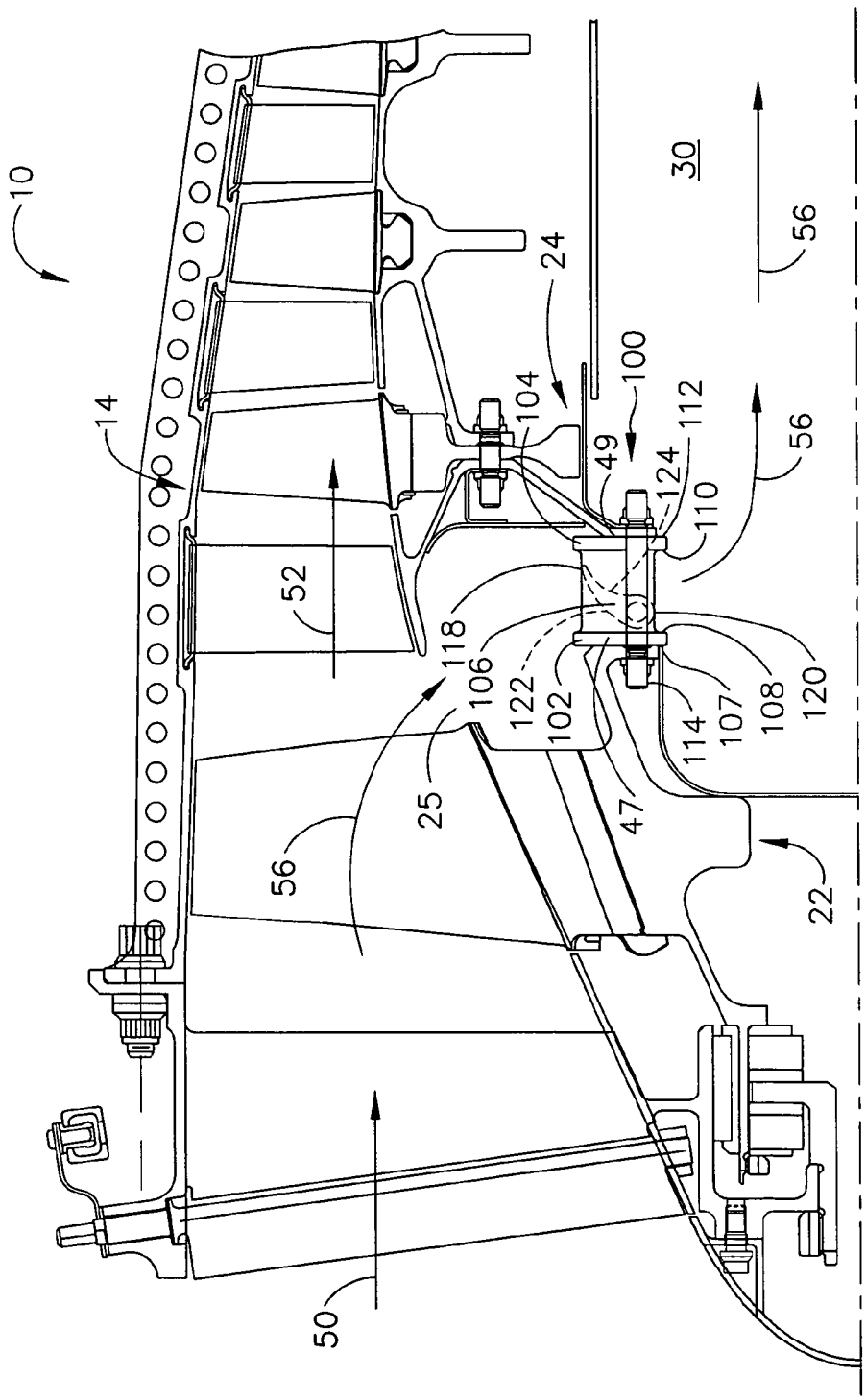
FIG. 2 is an enlarged cross-sectional view of a portion of the exemplary core gas turbine engine shown in FIG. 1.
Figure 3:
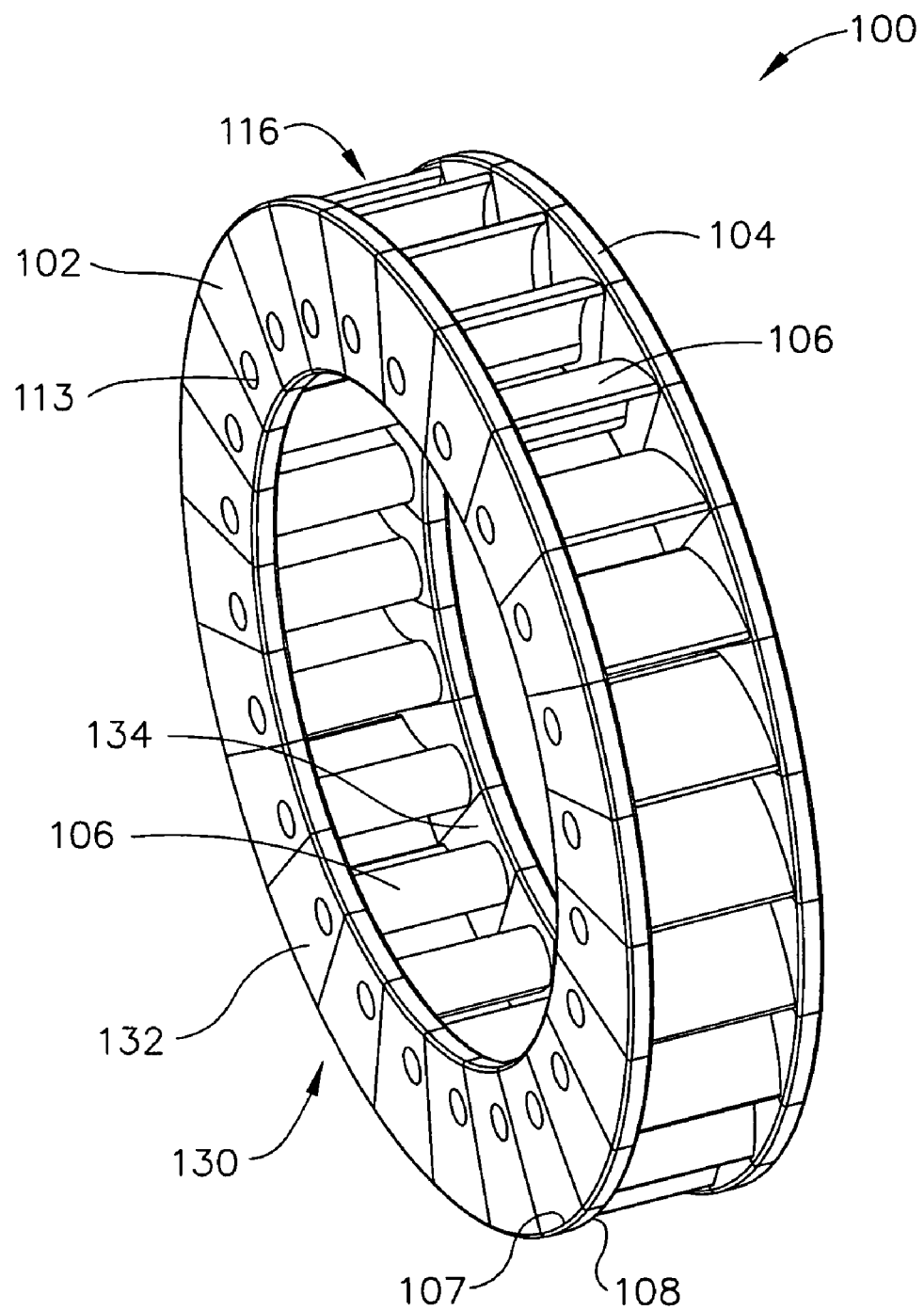
FIG. 3 is an enlarged perspective view of an air directing assembly used with the core gas turbine engine shown in FIG. 2.

FIG. 2 is an enlarged cross-sectional view of a portion of core gas turbine engine 10 including air directing assembly 100. FIG. 3 is an enlarged perspective view of air directing assembly 100. In the exemplary embodiment, air directing assembly 100 is coupled between compressor rotors 22 and 24 to direct airflow discharged from rotor 22 radially inward through internal air duct 30. More specifically, in the exemplary embodiment, assembly 100 is coupled in position within gap 25 such that a downstream side 47 of rotor 22 is coupled to assembly 100, and an upstream side 49 of rotor 24 is coupled to assembly 100.

In the exemplary embodiment, air directing assembly 100 includes a pair of annular rings 102 and 104, and a body 106 extending therebetween. In the exemplary embodiment, rings 102 and 104 are coupled to first compressor rotor 22 and adjacent second compressor rotor 24, respectively. Ring 102 includes an upstream surface 107 and a downstream surface 108, and similarly, ring 104 includes an upstream surface 110 and a downstream surface 112. In the exemplary embodiment, ring 102 is coupled to first compressor rotor 22 such that upstream surface 107 is coupled against first compressor rotor 22. In the exemplary embodiment, ring 104 is coupled to a portion of second compressor rotor 24 such that downstream surface 112 is coupled against second compressor rotor 24. In the exemplary embodiment, downstream surface 108 and upstream surface 110 define a flow path for air to flow through air directing assembly 100. Rings 102 and 104 each include a plurality of openings 113 that extend therethrough. More specifically, openings 113 extend from upstream surfaces 107 and 110 to respective downstream surfaces 108 and 112. Each opening 113 is sized to receive at least one fastening mechanism 114 therethrough to facilitate coupling rings 102 and 104 to rotors 22 and 24, respectively, using a plurality of bolts or fasteners. In the exemplary embodiment, openings 113 in ring 102 are concentrically aligned with openings 113 in ring 104 at the time of manufacture.

In the exemplary embodiment, rings 102, 104 and body 106 are machined or welded together to form air directing assembly 100. In the exemplary embodiment, assembly 100 includes a plurality of ring segments 130 that are coupled together to form a 360° ring. A ring segment 130 includes a single body 106, a portion 132 of ring 102, and a portion 134 of ring 104. For example, the 360° ring may include 36 ring segments 130 that each have an angle of 10°. In the exemplary embodiment, rings 102, 104 and body 106 are fixed to one another such that ring segments 130 do not turn and/or rotate under centrifugal loading.

In the exemplary embodiment, body 106 is aerodynamically-shaped. More specifically, in the exemplary embodiment, body 106 is formed of a plurality of airfoil-shaped members extending between rings 102 and 104 and attached to rings 102 and 104. Moreover, in the exemplary embodiment, airfoil-shaped members 106 are spaced circumferentially to form an annular ring 116 wherein ring 116 extends between rings 102 and ring 104. In the exemplary embodiment, rings 102 and 104 are integrally-formed with ring 116.

In an alternative embodiment, rings 102 and 104 are coupled to ring 116, and/or the airfoil-shaped members 106 are coupled to ring 116.

In the exemplary embodiment, each member of body 106 is substantially identical, and each includes an airfoil leading edge 118 and an airfoil trailing edge 120. Moreover, each body 106 includes a first sidewall 122 and a second sidewall 124. First sidewall 122 is convex and defines a suction side of each body 106, and second sidewall 124 is concave and defines a pressure side of each body 106. Sidewalls 122 and 124 are joined together at leading edge 118 and at trailing edge 120 of each body 106. First and second sidewalls 122 and 124 extend in span from upstream ring 102 to downstream ring 104.

During assembly of core gas turbine engine 10, high-pressure compressor 14 is coupled to shaft 20. In the exemplary embodiment, air directing assembly 100 is coupled between first and second compressor rotors 22 and 24. Because air directing assembly 100 is coupled to rotors 22 and 24, air directing assembly 100 rotates concurrently with compressor rotors 22 and 24.

Referring to FIG. 2, during operation, airflow 50 enters engine 10 and is channeled through first compressor rotor 22. First portion 52 of airflow 50 is channeled downstream through second compressor rotor 24 wherein it is mixed with fuel, and ignited to generate combustion gases that are eventually discharged downstream through discharge nozzle outlet 54. Second portion 56 of airflow 50 is channeled through gap 25 and into air directing assembly 100. Air directing assembly 100 channels airflow 56 into duct 30. In the exemplary embodiment, air directing assembly 100 channels airflow 56 across surfaces 108 and 110 of rings 102 and 104, respectively. Moreover, airflow 56 is directed past sidewalls 122 and 124 which direct airflow 56 into duct 30. Airflow 56 cools components of engine 10 as it flows through duct 30. Airflow 56 enables engine 10 to operate at higher cycle temperatures without negatively affecting the operation and efficiency of engine 10. Operating engine 10 at higher cycle temperatures enables engine 10 to be fabricated with a reduced engine size while maintaining constant engine efficiency.

During operation of engine 10, valve assembly 40 is moveable between a first operational position 48 (shown in FIG. 1) and a second operational position (not shown). In the exemplary embodiment, actuator 42 is powered hydraulically and is operated automatically to rotate valve assembly 40 between first operational position 48 and the second operational position. In first operational position 48, airflow 56 flowing through air duct 30 is not impeded by body 46 of valve assembly 40 such that airflow 56 is discharged through outlet 32 (shown in FIG. 1). In the exemplary embodiment, valve assembly 40 is positioned in the first operational position 48 while engine 10 is operating at cruise conditions and provides engine 10 with increased thrust.

Figure 4:
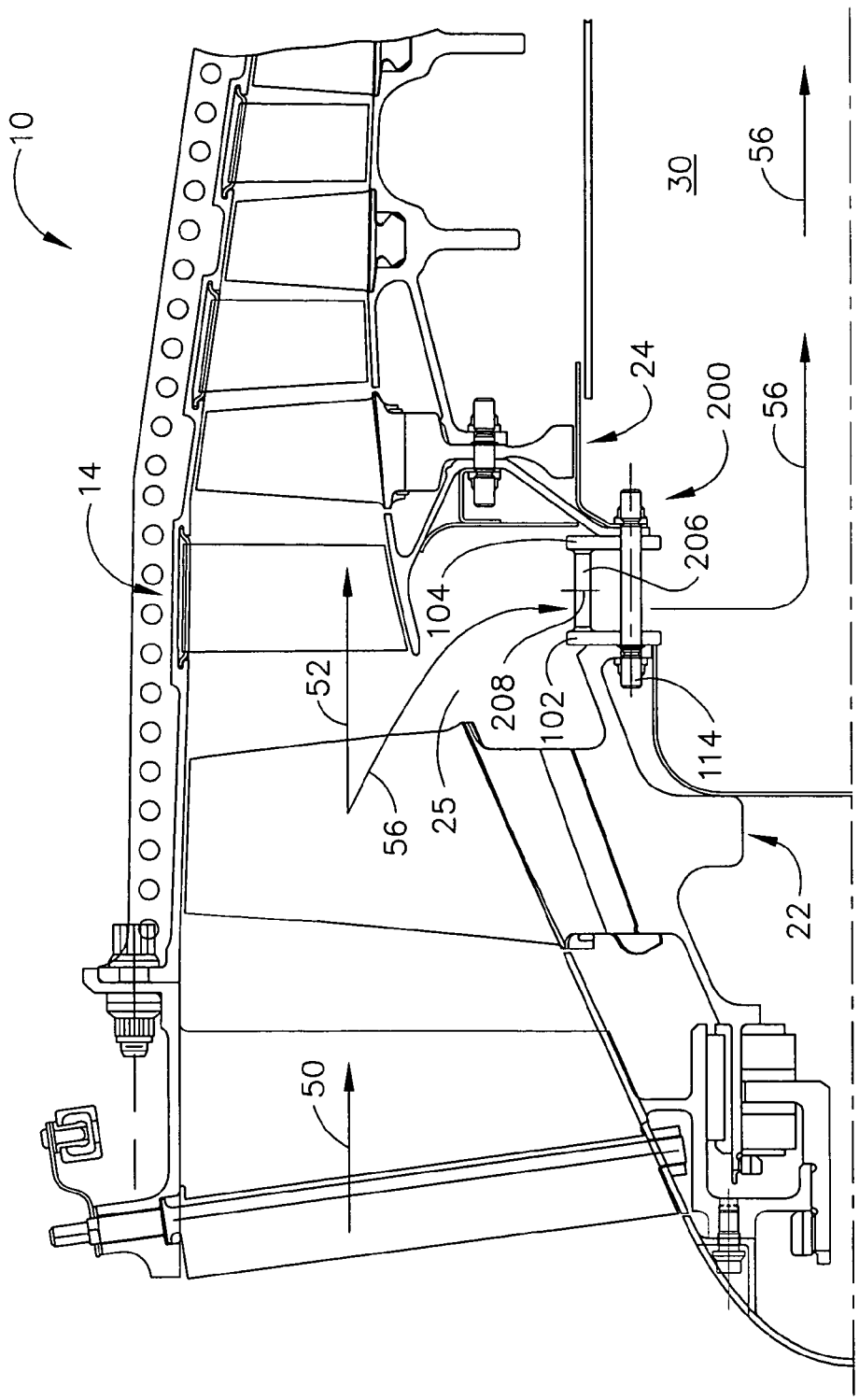
FIG. 4 is an enlarged cross-sectional view of a portion of the core gas turbine engine including an alternative air directing assembly shown in FIG. 1.
Figure 5:
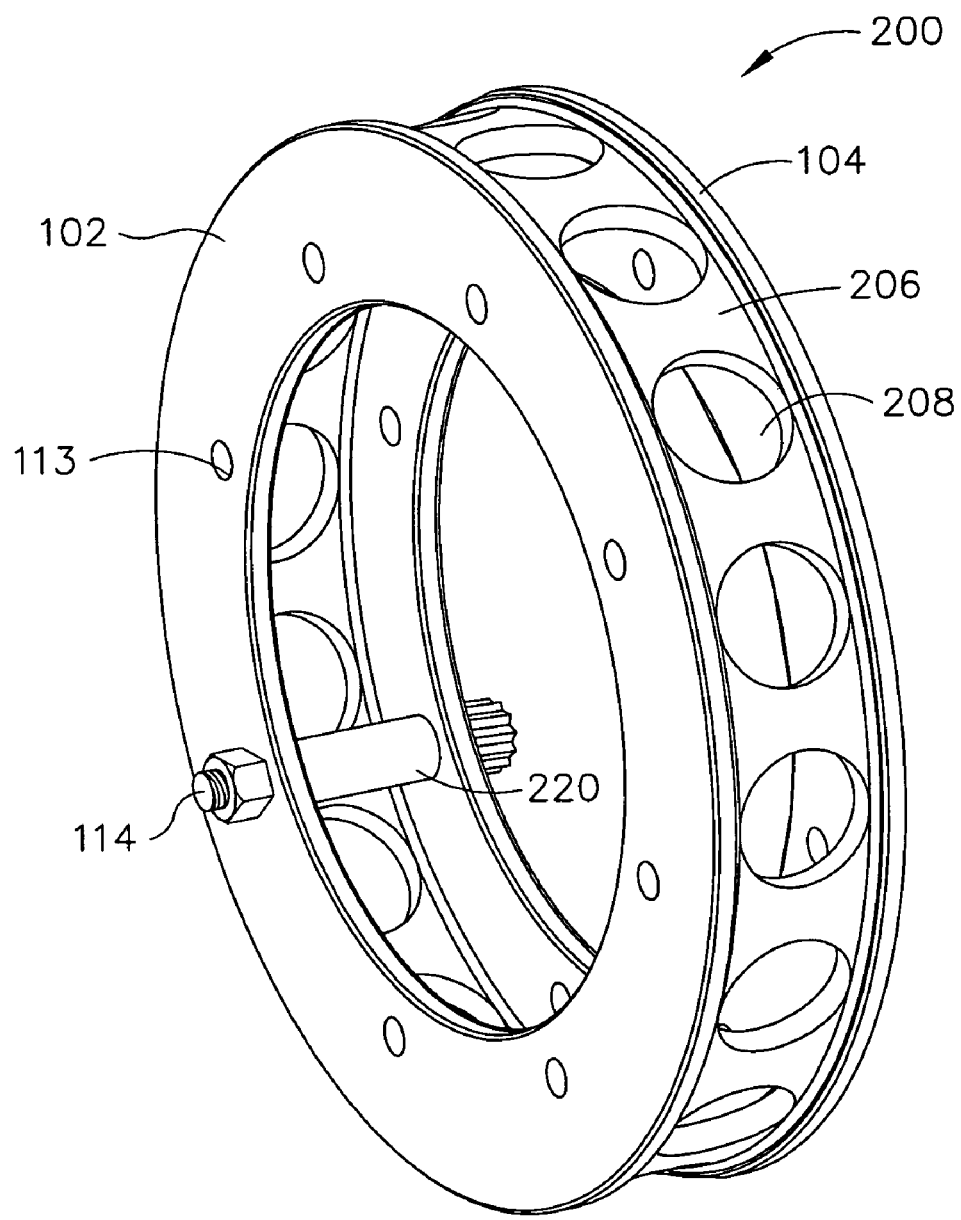
FIG. 5 is an enlarged perspective view of the air directing assembly shown in FIG. 4.

FIG. 4 is an enlarged cross-sectional view of a portion of core gas turbine engine 10 including an alternative air directing assembly 200. FIG. 5 is an enlarged perspective view of air directing assembly 200. Air directing assembly 200 is coupled between first and second compressor rotors 22 and 24 to enable airflow discharged from first compressor rotor 22 to be channeled radially inward through internal air duct 30. Air directing assembly 200 is similar to air directing assembly 100, and as such, components of FIG. 4 that are identical to components of FIG. 2 are referenced in FIG. 4 using the same reference numerals used in FIG. 2.

Air directing assembly 200 is coupled between first and second compressor rotors 22 and 24. In the exemplary embodiment, air directing assembly 200 includes rings 102 and 104, and has a body 206 extending therebetween. Body 206 is annular and is oriented substantially perpendicular to rings 102 and 104. In the exemplary embodiment, rings 102 and 104 are formed integrally with body 206. Alternatively, rings 102 and 104 are coupled to body 206. Specifically, in the exemplary embodiment, body 206 includes a plurality of openings 208 extending therethrough. Openings 208 are sized and oriented to direct air through air directing assembly 200 into internal air duct 30. In the exemplary embodiment, openings 208 have a circular shape. In an alternative embodiment, openings 208 have a square shape. In a further alternative embodiment, openings 208 have any suitable shape that facilitates channeling air 56 through air directing assembly 200.

During assembly of core gas turbine engine 10, high-pressure compressor 14 is coupled to shaft 20. In the exemplary embodiment, air directing assembly 200 is coupled between first and second compressor rotors 22 and 24 to enable air discharged from first compressor rotor 22 to be channeled inwardly through internal air duct 30. Because air directing assembly 200 is coupled to rotors 22 and 24, air directing assembly 200 rotates concurrently with compressor rotors 22 and 24. In the exemplary embodiment, air directing assembly 200 is coupled to first and second compressor rotors 22 and 24 with a plurality of fastening mechanisms 114 such as bolts or fasteners. Each opening 113 is sized to receive at least one fastening mechanism 114. In the exemplary embodiment, at least one sleeve 220 is coupled between an opening 113 of ring 102 and concentrically aligned opening 113 of ring 104. In the exemplary embodiment, sleeve 220 is welded between rings 102 and 104. In the exemplary embodiment, a fastening mechanism 114 extends through opening 113 of ring 102, concentrically aligned opening 113 of ring 104, and sleeve 220 wherein sleeve 220 reduces bending stresses that may be induced to fastening mechanism 114.

Referring to FIG. 4, during operation, airflow 50 enters engine 10 and is channeled through first compressor rotor 22. First portion 52 of airflow 50 is channeled downstream through second compressor rotor 24 wherein it is mixed with fuel, and ignited to generate combustion gases that are eventually discharged downstream through discharge nozzle outlet 54. Second portion 56 of airflow 50 is channeled through gap 25 and into air directing assembly 200. Air directing assembly 200 channels airflow 56 into duct 30. In the exemplary embodiment, air directing assembly 200 channels airflow 56 across surfaces 108 and 110 of rings 102 and 104, respectively. Moreover, airflow 56 is directed through openings 208 which direct airflow 56 into duct 30. Airflow 56 cools components of engine 10 as it flows through duct 30. Airflow 56 enables engine 10 to operate at higher cycle temperatures without negatively affecting the operation and efficiency of engine 10. Operating engine 10 at higher cycle temperatures enables engine 10 to be fabricated with a reduced engine size while maintaining constant engine efficiency.

During operation of engine 10, valve assembly 40 is moveable between first operational position 48 (shown in FIG. 1) and second operational position (not shown). In the exemplary embodiment, actuator 42 is powered hydraulically and is operated automatically to rotate valve assembly 40 between first operational position 48 and the second operational position. In first operational position 48, airflow 56 flowing through air duct 30 is not impeded by body 46 of valve assembly 40 such that airflow 56 is discharged through outlet 32 (shown in FIG. 1). In the exemplary embodiment, valve assembly 40 is positioned in the first operational position 48 while engine 10 is operating at cruise conditions and provides engine 10 with increased thrust.

The method of assembling engine 10 described herein includes, in one embodiment, providing a high-pressure compressor including a first rotor and a second compressor rotor coupled downstream from the first rotor, coupling a high-pressure turbine downstream from the compressor such that the turbine is coupled to the compressor by a first shaft such that the first shaft includes an internal air duct defined therein, and coupling an air directing assembly between the first and second compressor rotors wherein the air directing assembly is configured to direct a portion of airflow discharged from the first rotor inward through the internal air duct.

The above-described air directing assemblies and engine facilitate providing increased thrust to the engine by directing a portion of the airflow exiting the first rotor through the internal duct in the engine. Channeling airflow through the internal duct in the engine also facilitates cooling of various components of the engine. Directing airflow through the internal duct of the engine enables the engine to have a reduced engine size and still operate at a constant efficiency.

Exemplary embodiments of air directing assemblies are described above in detail. Each air directing assembly is not limited to use with the specific embodiments described herein, but rather, each air directing assembly can be utilized independently and separately from other components described herein. Moreover, the invention is not limited to the embodiments of the air directing assemblies described above in detail. Rather, other variations of air directing assemblies may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
   providing a high-pressure compressor including a first compressor rotor and an adjacent second compressor rotor coupled downstream from the first compressor rotor;
   coupling a high-pressure turbine downstream from the compressor such that the turbine is coupled to the compressor by a first shaft such that the first shaft includes an internal air duct defined therein;
   coupling an air directing assembly between the first and second compressor rotors wherein the air directing assembly is configured to direct a portion of airflow discharged from the first compressor rotor inward through the internal air duct, and
   coupling a valve assembly downstream from the turbine to selectively control airflow through the internal air duct.

2. A method in accordance with claim 1 wherein the air directing assembly includes a pair of rings and a body extending therebetween, said method further comprises coupling each ring of the pair of rings to one of the first and second compressor rotors.

3. A method in accordance with claim 2 wherein providing a high-pressure compressor further comprises providing a high-pressure compressor including a first and second compressor rotor coupled within the gas turbine engine such that a gap is defined between the first and second compressor rotors.

4. A method in accordance with claim 1 wherein coupling an air directing assembly between the first and second compressor rotors further comprises coupling the air directing assembly between the first and second compressor rotors such that the air directing assembly rotates concurrently with the first and second compressor rotors.

5. A gas turbine engine assembly comprising:
a high-pressure compressor comprising a first compressor rotor and a second compressor rotor disposed downstream from said first compressor rotor;
a high-pressure turbine coupled downstream to said compressor by a first shaft;
an internal air duct substantially concentrically aligned within said first shaft; and
an air directing assembly coupled between said first and second compressor rotors for selectively channeling airflow discharged from said first compressor rotor inward through said internal air duct, and
a valve assembly positioned downstream from the turbine to selectively control airflow through the internal air duct.

6. A gas turbine engine in accordance with claim 5 wherein said air directing assembly comprises a pair of rings and a body extending therebetween.

7. A gas turbine engine in accordance with claim 6 wherein said body comprises an annular ring, said body extends substantially perpendicularly between said pair of rings.

8. A gas turbine engine in accordance with claim 6 wherein said body comprises a plurality of openings extending therethrough, said plurality of openings facilitate channeling air into said first shaft.

9. A gas turbine engine in accordance with claim 6 wherein said body comprises an airfoil shape extending between said pair of rings.

10. A gas turbine engine in accordance with claim 9 wherein said body comprises a leading edge, a trailing edge, a first sidewall, and a second sidewall wherein said leading edge and said trailing edge are each coupled to one of said pair of rings.

11. A gas turbine engine in accordance with claim 6 wherein said gas turbine engine further comprises at least one fastening mechanism coupling said air directing assembly between said first compressor rotor and said second compressor rotor such that said air directing assembly rotates concurrently with said first and second compressor rotors.

12. A gas turbine engine in accordance with claim 5 wherein said gas turbine engine further comprises a centerbody extending radially outward from said first shaft.

13. A gas turbine engine in accordance with claim 12 wherein said gas turbine engine further comprises a valve assembly downstream from said turbine, said assembly comprises an actuator, a butterfly valve, and a stem extending therebetween, said stem extends through a portion of said centerbody.

14. A gas turbine engine in accordance with claim 13 wherein said at least one butterfly valve is operated hydraulically.

* * * * *